US008249672B2

(12) United States Patent
Chen et al.

(10) Patent No.: US 8,249,672 B2
(45) Date of Patent: Aug. 21, 2012

(54) TRANSMISSION PLUG AND RELATED COMPLEX EARPHONE AND RADIO PLAYER

(75) Inventors: Shih-Hong Chen, Taipei Hsien (TW); Chieh-Sheng Hsu, Taipei Hsien (TW)

(73) Assignee: Wistron NeWeb Corporation, Hsi-Chih, Taipei Hsien (TW)

( * ) Notice: Subject to any disclaimer, the term of this patent is extended or adjusted under 35 U.S.C. 154(b) by 419 days.

(21) Appl. No.: 12/646,979

(22) Filed: Dec. 24, 2009

(65) Prior Publication Data

US 2010/0184367 A1 Jul. 22, 2010

(30) Foreign Application Priority Data

Jan. 19, 2009 (TW) ................................ 98101876 A

(51) Int. Cl.
*H04B 1/38* (2006.01)

(52) U.S. Cl. .................. 455/575.2; 455/575.6; 455/130; 455/344; 455/66.1; 380/384; 380/123; 380/343; 380/367; 439/668; 439/669; 439/626; 439/652

(58) Field of Classification Search ................. 455/3.02, 455/575.2, 575.6, 130, 344, 66.1; 381/384, 381/123, 343, 367, 370, 374; 439/668, 669, 439/620.32, 626, 652
See application file for complete search history.

(56) References Cited

U.S. PATENT DOCUMENTS

2006/0013410 A1* 1/2006 Wurtz ............................ 381/74
2006/0030219 A1* 2/2006 Huang .......................... 439/669
2006/0089054 A1* 4/2006 Woo .............................. 439/668

* cited by examiner

*Primary Examiner* — Tuan Pham
(74) *Attorney, Agent, or Firm* — Winston Hsu; Scott Margo

(57) ABSTRACT

A transmission plug for a complex earphone is disclosed. The complex earphone is capable of receiving a broadcast signal and sending out an audio signal. The transmission plug includes a first metal ring for providing an audio grounding, a first insulation layer formed inside the first metal ring, a second metal ring formed inside the first insulation layer for transmitting the audio signal, a second insulation layer formed inside the second metal ring, and a radio-frequency transmission stick formed inside the second insulation layer for transmitting the broadcast signal, wherein a shape of the transmission plug conforms to an international standard audio plug.

20 Claims, 10 Drawing Sheets

TRANSMISSION PLUG AND RELATED COMPLEX EARPHONE AND RADIO PLAYER

BACKGROUND OF THE INVENTION

1. Field of the Invention

The present invention is related to a transmission plug and related complex earphone and radio player, and more particularly, to a transmission plug and related complex earphone and radio player capable of increasing an utilization range.

2. Description of the Prior Art

Handheld radio players, such as satellite, digital, AM/FM (amplitude modulation and frequency modulation) broadcast receivers, can receive broadcast signals and send out radio programs after operations like demodulation and audio signal processing. In order to receive the broadcast signals and outputting audio signals, a handheld radio player equips two independent interfaces; one is utilized for coupling to an antenna for receiving the broadcast signals, and the other is for coupling to an earphone or a speaker to output the audio signals. Under such circumstance, since interfaces of the antenna and the earphone are independent, and the broadcast signals and the audio signals are transmitted via different lines, the handheld radio player easily causes a messy condition and decreases convenience. Therefore, the prior art has developed an integrated interface to improve the problems mentioned above.

Please refer to FIG. 1. FIG. 1 is a schematic diagram of a handheld radio player 10 of the prior art. The handheld radio player 10 comprises a radio receiver 100, a complex earphone 102, a transmission interface 104 and a complex transmission line 106. Except an audio output device 108, the complex earphone 102 further includes a reception antenna 110, which connects to the radio receiver 100 via the complex transmission line 106 and the transmission interface 104. The transmission interface 104 is an integrated interface which transmits the broadcast signals and the audio signals via different pins. The complex transmission line 106 is a combination of multiple lines utilized for transmitting the broadcast signals and the audio signals. Therefore, while the handheld radio player 10 is in operation, the broadcast signals received by the reception antenna 110 are transmitted to the radio receiver 100 via the complex transmission line 106 and the transmission interface 104. After operations of filtering, demodulation and audio signal processing, the radio receiver 100 transmits the audio signals to the audio output device 108 via the transmission interface 104 and the complex transmission line 106, to send out the radio programs.

In FIG. 1, the handheld radio player 10 transmits the broadcast signals and the audio signals merely via the single transmission interface 104 and the complex transmission line 106, so as to reduce the messy condition and enhance the convenience. However, a type of the transmission interface 104 is usually unique and set up by related manufacturers, which does not conform to an international standard. Hence, the earphone 102 only matches the radio receiver 100, causing a limited utilization range of the earphone 102.

SUMMARY OF THE INVENTION

It is therefore a primary objective of the claimed invention to provide a transmission plug and related complex earphone and radio player.

An embodiment of the invention discloses a transmission plug for a complex earphone. The complex earphone is utilized for receiving a broadcast signal and sending out an audio signal. The transmission plug comprises a first metal ring for providing an audio grounding, a first insulation layer formed inside the first metal ring, a second metal ring formed inside the first insulation layer for transmitting the audio signal, a second insulation layer formed inside the second metal ring, and a radio-frequency transmission stick formed inside the second insulation layer for transmitting the broadcast signal. A shape of the transmission plug conforms to an international standard audio plug.

An embodiment of the invention further discloses a complex earphone for a radio receiver, which comprises a reception antenna for receiving a broadcast signal, an audio output device for playing an audio signal, and a transmission plug capable of being coupled to the radio receiver by means of plugging, with a shape conforming to an international standard audio plug. The transmission plug comprises a first metal ring coupled to the audio output device for providing an audio grounding, a first insulation layer formed inside the first metal ring, a second metal ring formed inside the first insulation layer and coupled to the audio output device, for transmitting the audio signal, a second insulation layer formed inside the second metal ring, and a radio-frequency transmission stick formed inside the second insulation layer and coupled to the reception antenna for transmitting the broadcast signal.

An embodiment of the invention further discloses a radio player, which comprises a radio receiver, a jack, and a complex earphone. The radio receiver is utilized for processing a broadcast signal and outputting a corresponding audio signal. The jack is formed in the radio receiver, and comprises a first metal spring pin for providing an audio grounding, a second metal spring pin, for transmitting the audio signal, and a radio-frequency reception jack for transmitting the broadcast signal. The complex earphone comprises a reception antenna for receiving the broadcast signal, an audio output device for playing the audio signal, a transmission plug capable of being coupled to the jack by means of plugging in, with a shape conforming to an international standard audio plug. The transmission plug comprises a first metal ring coupled to the audio output device and the first metal spring pin for providing the audio grounding, a first insulation layer formed inside the first metal ring, a second metal ring formed inside the first insulation layer and coupled to the audio output device and the second metal spring pin for transmitting the audio signal, a second insulation layer formed inside the second metal ring, and a radio-frequency transmission stick formed inside the second insulation layer and coupled to the reception antenna and the radio-frequency reception jack for transmitting the broadcast signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
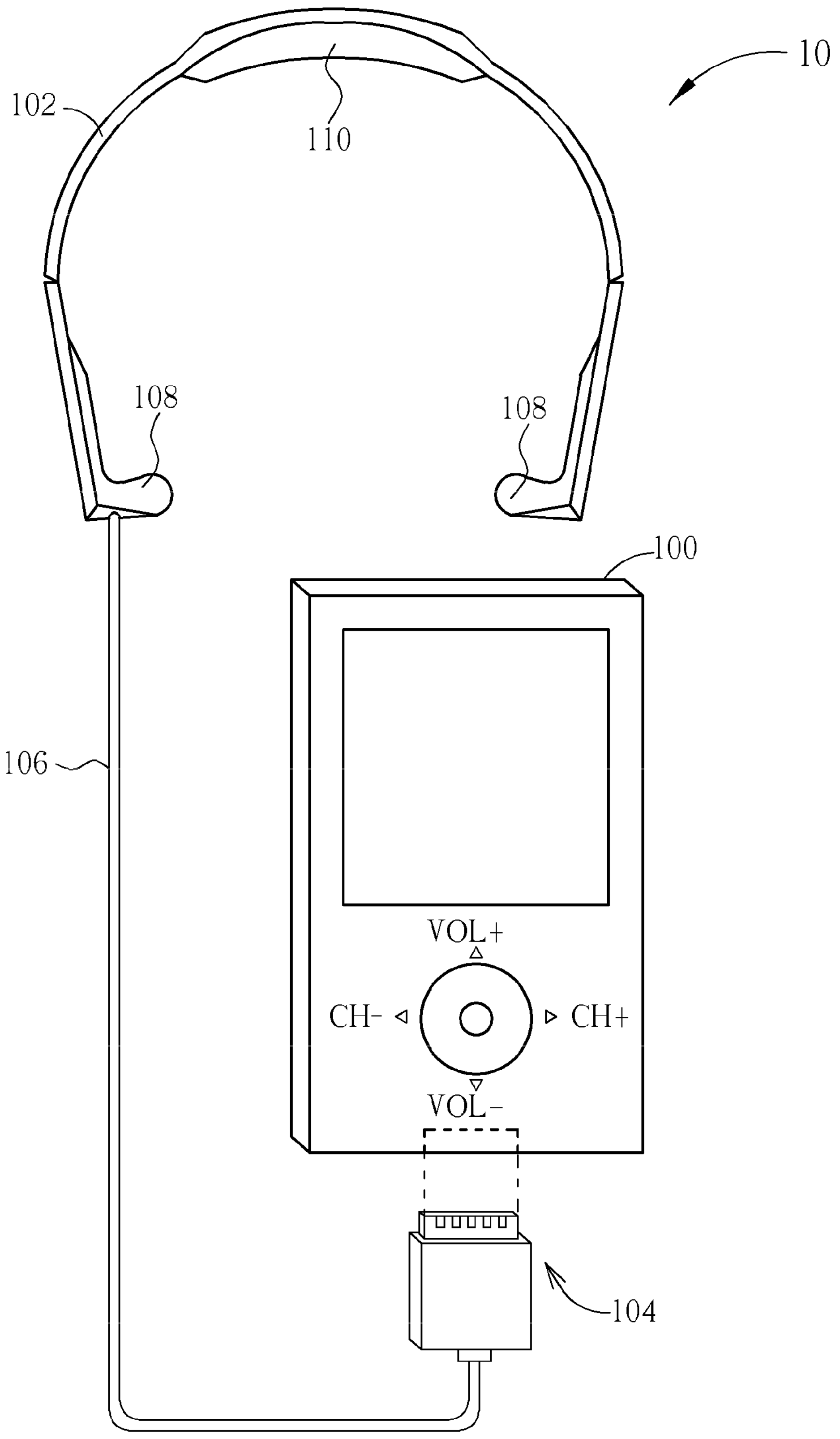
FIG. 1 PRIOR ART
FIG. 1 is a schematic diagram of a handheld radio player of the prior art.
Figure 2:
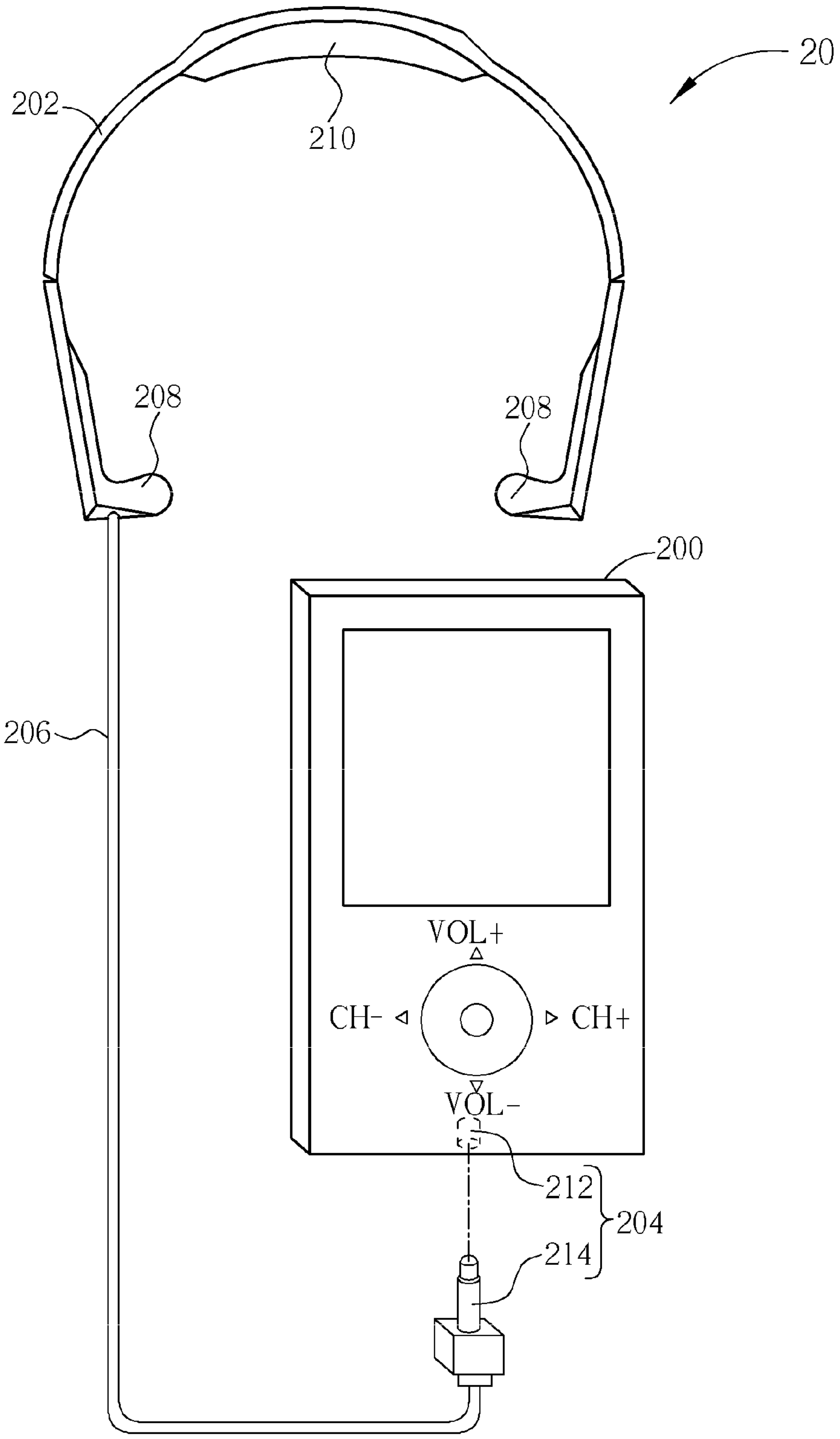
FIG. 2 is a schematic diagram of a radio player according to an embodiment of the invention.

Please refer to FIG. 2. FIG. 2 is a schematic diagram of a radio player 20 according to an embodiment of the invention. The radio player 20 can send out broadcast signals such as satellite, digital, AM, FM broadcast signals. The radio player 20 comprises a radio receiver 200, a complex earphone 202, a transmission interface 204, and a complex transmission line 206. The architecture and operation of the radio player 20 are similar to those of the handheld radio player 10 shown in FIG. 1. That is, except an audio output device 208, the complex earphone 202 further includes a reception antenna 210, which connects to the radio receiver 200 via the complex transmission line 206 and the transmission interface 204. The difference between the radio player 20 and the handheld radio player 10 is that the transmission interface 204 of the radio player 20 is composed of a jack 212 and a transmission plug 214, which can combine together, and a shape of the transmission plug 214 conforms to an international standard audio plug (2.5 mm or 3.5 mm). In other words, the invention uses the transmission plug 214 having a shape corresponding to a standard audio plug, to transmit broadcast signals and audio signals. Under such circumstance, the complex earphone 202 can be utilized not only for the radio receiver 200 but also for other products, so as to broaden a utilization range.

Figure 3A:
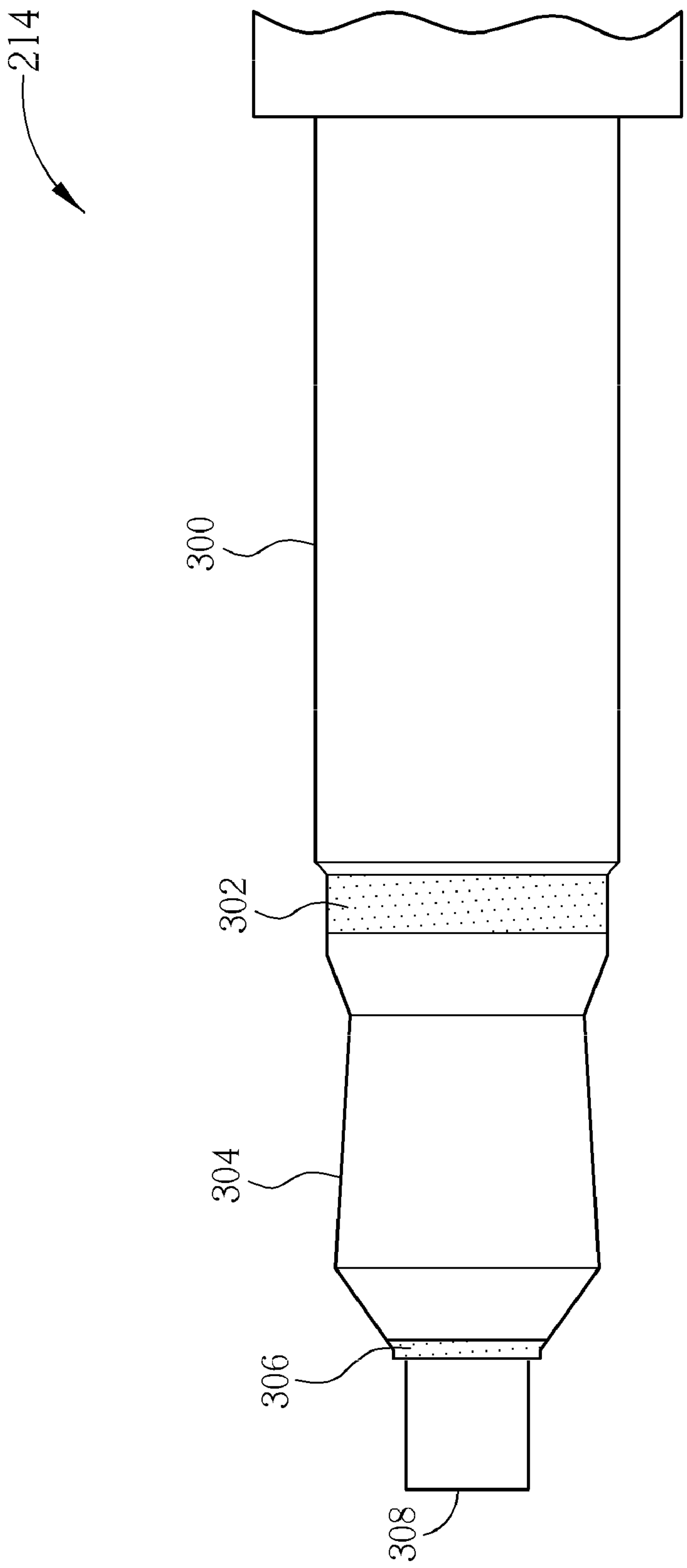
FIG. 3A is a lateral view diagram of a transmission plug shown in FIG. 2.
Figure 3B:
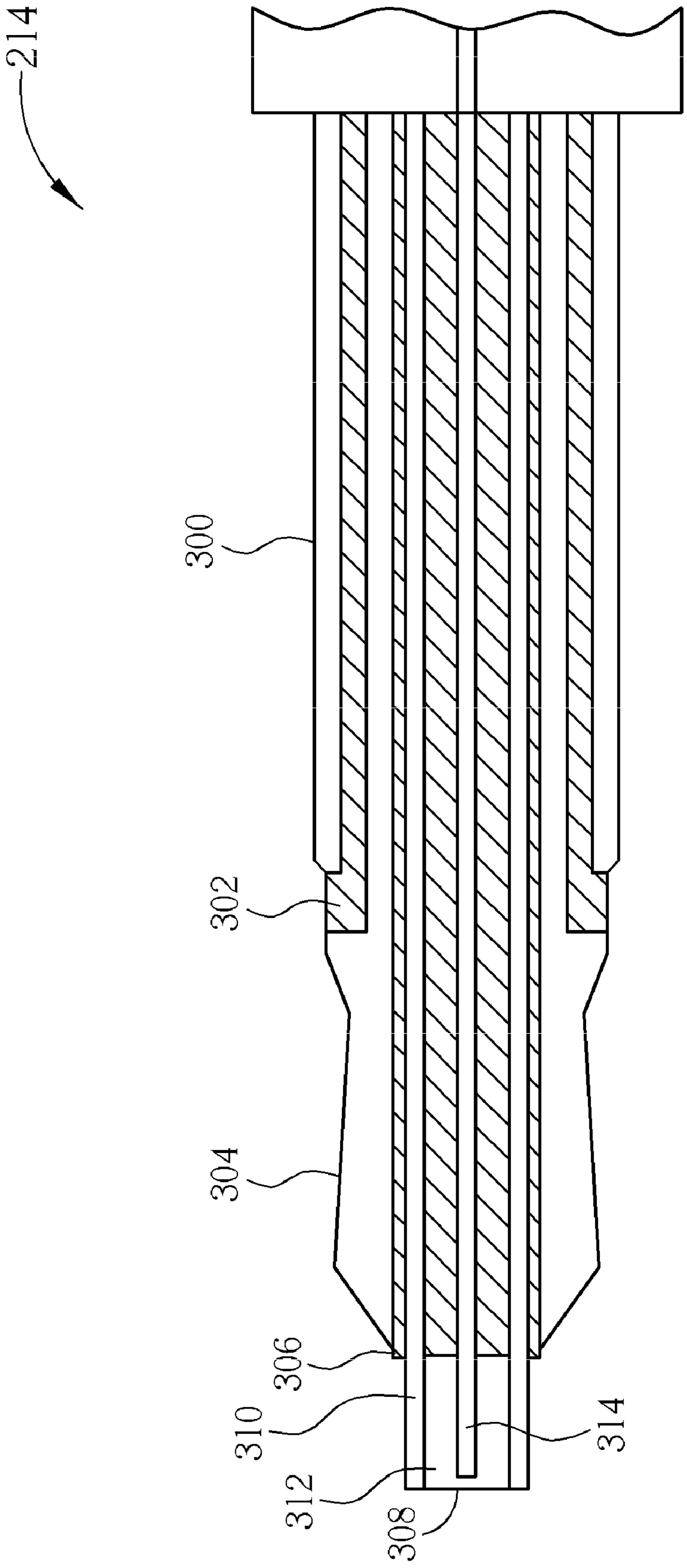
FIG. 3B is a cross-sectional view diagram of a transmission plug shown in FIG. 2.

Please refer to FIG. 3A and FIG. 3B. FIG. 3A and FIG. 3B are lateral view and cross-sectional view diagrams of the transmission plug 214 in FIG. 2. The transmission plug 214 can be plugged into the jack 212, and comprises a first metal ring 300, a first insulation layer 302, a second metal ring 304, a second insulation layer 306, and a radio-frequency transmission stick 308. The first metal ring 300 and the second metal ring 304 are coupled to the audio output device 208 via the complex transmission line 206, and utilized for transmitting audio signals and providing audio grounding respectively. The first insulation layer 302 is formed between the first metal ring 300 and the second metal ring 304, and utilized for isolating the first metal ring 300 and the second metal ring 304. Besides, different to a prior art audio jack, the radio-frequency transmission stick 308 is formed in a center location of the transmission plug 214, insulated from the second metal ring 304 by the second insulation layer 306, and utilized for transmitting broadcast signals received by the reception antenna 210 to the radio receiver 200. As shown in FIG. 3B, the radio-frequency transmission stick 308 comprises a third metal ring 310, a third insulation layer 312, and a metal stick 314. The third insulation layer 312 is utilized for isolating the third metal ring 310 and the metal stick 314. The third metal ring 310 forms inside the second insulation layer 306, and utilized for providing radio-frequency grounding. The metal stick 314 forms inside the third insulation layer 312, and utilized for transmitting broadcast signals.

As shown in FIG. 3A and FIG. 3B, the transmission plug 214 transmits audio signals via the first metal ring 300 and the second metal ring 304, and transmits broadcast signals via the radio-frequency transmission stick 308. Because the shape of the transmission plug 214 conforms to the international standard audio plug, the complex earphone 202 can apply not only to the radio receiver 200 but also to common media player devices, such as mp3 and CD players. Therefore, a user can listen to radio programs via the complex earphone 202 and apply the complex earphone 202 to other media player devices, so as to increase the convenience.

Figure 4:
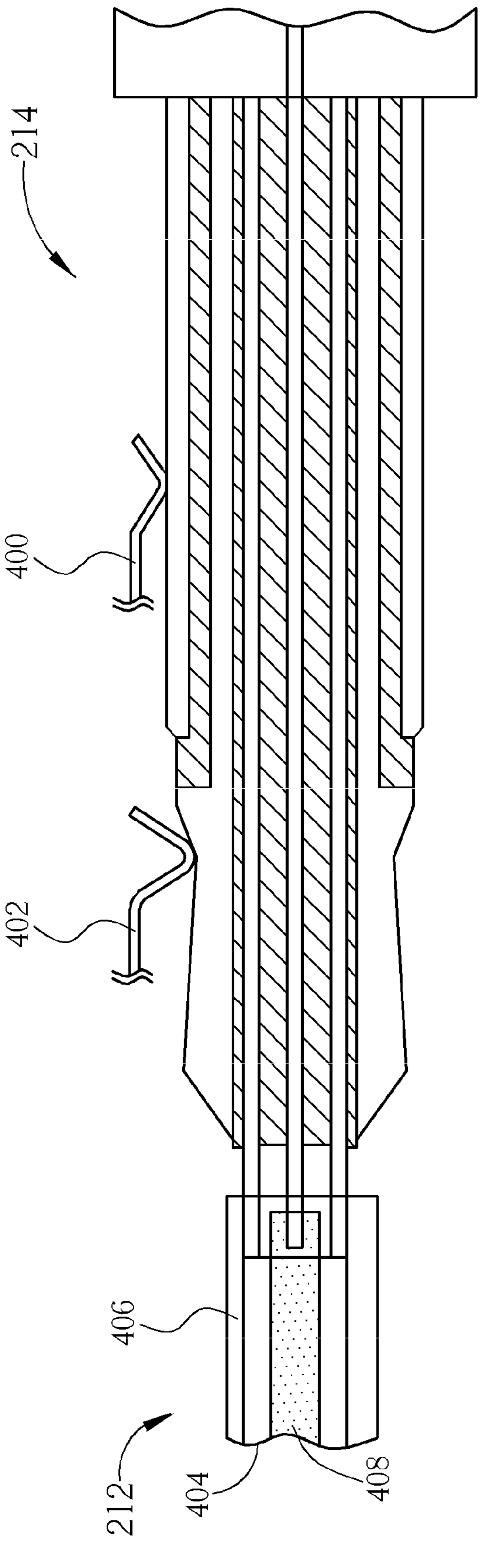
FIG. 4 is a schematic diagram of a combination of a jack and a transmission plug shown in FIG. 2.

Therefore, via the transmission plug 214, the complex earphone 202 can be applied to both the radio receiver 200 and a common media player device, so that the utilization range of the complex earphone 202 is no longer limited to the radio receiver 200. Correspondingly, the jack 212 can be derived from a traditional audio jack to include a reception interface of broadcast signals. Please refer to FIG. 4. FIG. 4 is a schematic diagram of the jack 212 and the transmission plug 214 after combined. As shown in FIG. 4, the jack 212 comprises a first metal spring pin 400, a second metal spring pin 402, and a radio-frequency reception jack 404. The first metal spring pin 400 and the second metal spring pin 402 are utilized for providing the audio grounding and transmitting audio signals respectively, which are well-know structures in the prior art. However, a difference to the prior art is that the jack 212 further includes the radio-frequency reception jack 404, which comprises a fourth metal ring 406 and a hole 408, coupled to the third metal ring 310 and the metal stick 314, to provide the radio-frequency grounding and transmit broadcast signals respectively. Note that, for clarity, FIG. 4 only shows relative positions of the first metal spring pin 400, the second metal spring pin 402, and the radio-frequency reception jack 404. Others components like fixing mechanism, connection lines, etc. are not related to the idea of the invention, and should be well known for those skilled in the art.

Via the jack 212, the radio receiver 200 can be equipped with the complex earphone 202, to receive broadcast signals and output audio signals. Since the jack 212 is fit for an international standard audio plug, the radio receiver 200 can be equipped with general earphones and speakers. Under such circumstance, if the radio receiver 200 comprises other audio functions (e.g. MP3) or can record broadcast programs, the radio receiver can output related audio via the general earphones and speakers. In other words, except that the complex earphone 202 can be utilized for other media player devices, the radio receiver 200 can output audio signals via general earphones and speakers, to further broaden the utilization range.

Figure 5A:
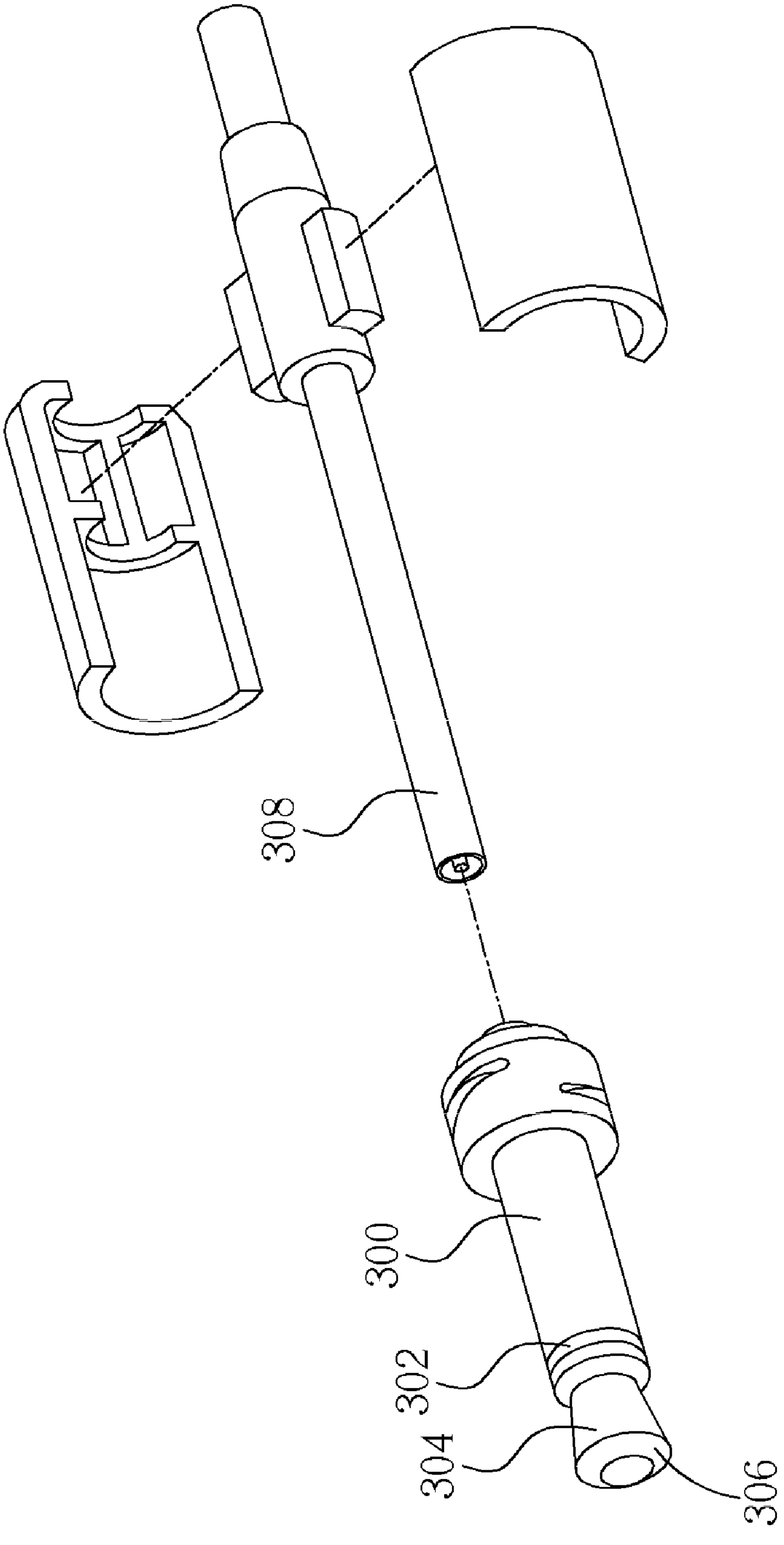
FIG. 5A to FIG. 5E are schematic diagrams of a transmission plug shown in FIG. 2, capable of moving back and forth.
Figure 5B:
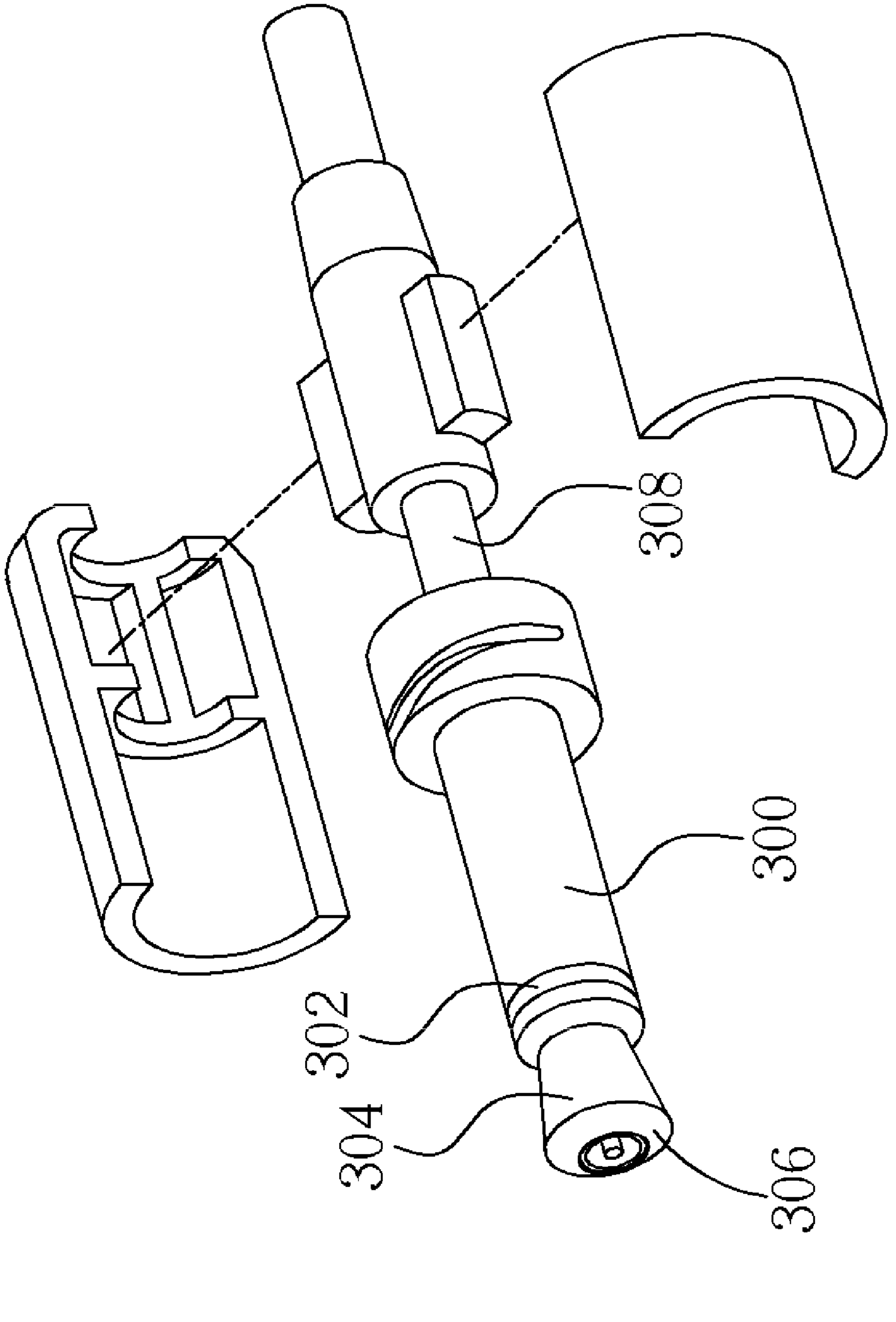
Figure 5C:
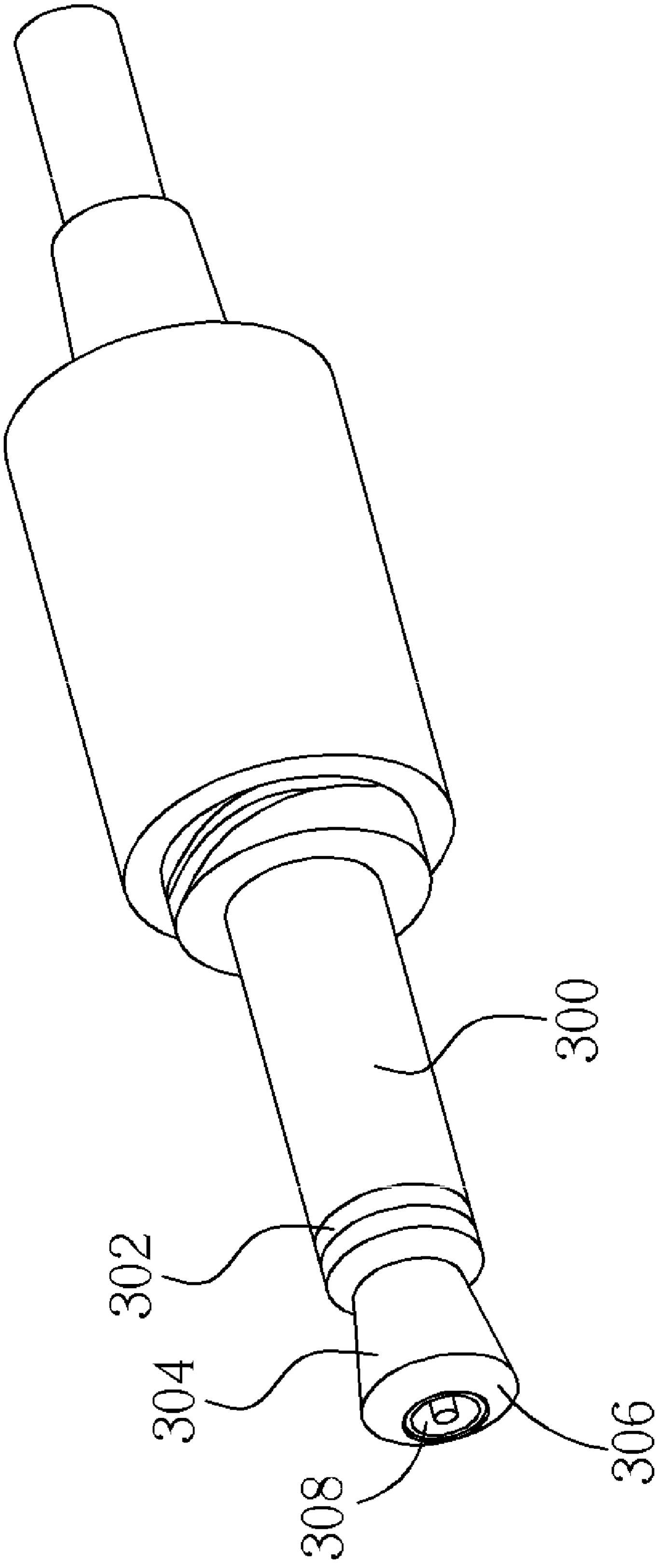
Figure 5D:
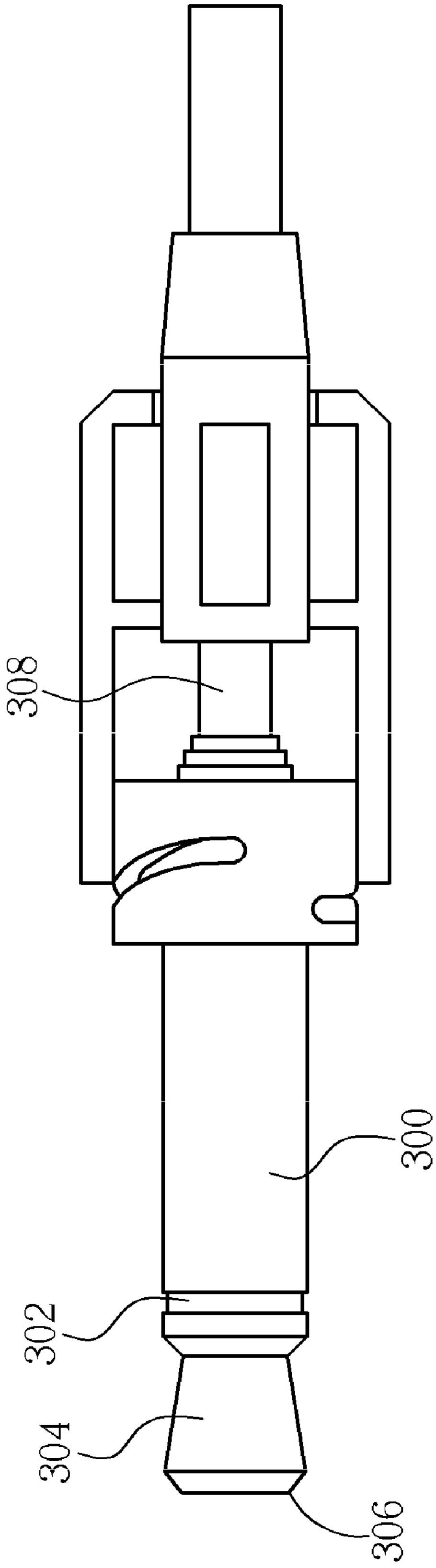
Figure 5E:
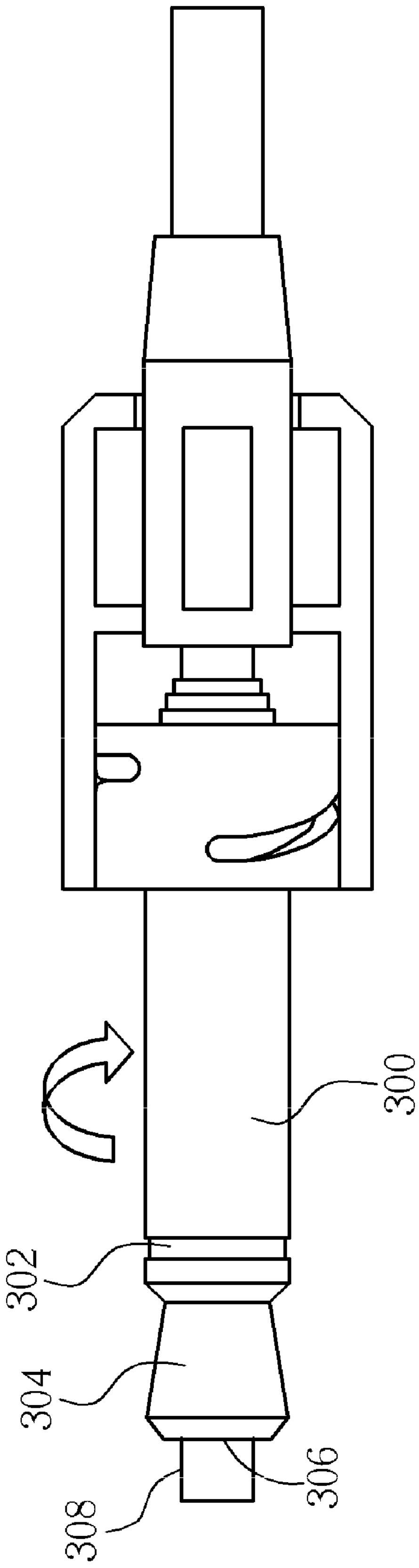

In FIG. 3A, FIG. 3B and FIG. 4, the radio-frequency transmission stick 308 of the transmission plug 214 is fixed inside the second insulation layer 306 and embedded in the radio-frequency reception jack 404. In other words, the radio-frequency transmission stick 308 is protruding. Under such circumstance, in order to fit all media player devices with international standard audio jacks, the radio-frequency transmission stick 308 of the transmission plug 214 can be further designed to be capable of moving back and forth. For example, please refer to FIG. 5A to FIG. 5E. FIG. 5A to FIG. 5C are schematic diagrams of the transmission plug 214 capable of moving back and forth according to an embodiment of the invention, and FIG. 5D to FIG. 5E are schematic diagrams of the transmission plug 214 when moving back and forth. As shown in FIG. 5A to FIG. 5E, the invention adds a groove structure in the transmission plug 214, so that the user can move the radio-frequency transmission stick 308 in or out from the transmission plug 214 by rotation. As a result, the transmission plug 214 can be fit for all media player devices with international standard audio jacks.

FIG. 5A to FIG. 5E are schematic diagrams of the embodiment of the transmission plug 214, to implement the radio-frequency transmission stick 308 capable of moving back and forth, and those skilled in the art can make modifications and alterations on the transmission plug 214 according to different requirements. For example, except of rotation, the radio-frequency transmission stick 308 can also move back and forth by pressing. Note that, the invention transmits broadcast signals via the radio-frequency transmission stick 308 formed inside the transmission plug 214, to allow the complex earphone 202 utilized not only for the radio receiver 200 but also for other products. Hence, whether the radio-frequency transmission stick 308 can be moved in or out, there is no affect on concept of the invention.

In the prior art, as shown in FIG. 1, the type of the transmission interface 104 is usually unique and set up by related manufacturers, which does not conform to international standard. Hence, the earphone 102 only matches the radio receiver 100, causing the limited utilization range of the earphone 102. In comparison, the shape of the transmission plug 214 in the invention conforms to the international standard audio plug, allowing the complex earphone 202 utilized not only for the radio receiver 200 but also for other products. Meanwhile, if the design of the radio-frequency transmission stick 308 is telescopic, the utilization range of the complex earphone 202 can be further broadened.

To sum up, in the invention, the transmission plug 214 transmits audio signals via the first metal ring 300 and the second metal ring 304, and transmits broadcast signals via the radio-frequency transmission stick 308. The shape of the transmission plug 214 conforms to the international standard audio plug, and therefore, the complex earphone 202 can be utilized not only for the radio receiver 200 but also for other products, so as to increase the utilization range.

Those skilled in the art will readily observe that numerous modifications and alterations of the device and method may be made while retaining the teachings of the invention.

What is claimed is:

1. A transmission plug for a complex earphone utilized for receiving a broadcast signal and sending out an audio signal, the transmission plug comprising:
- a first metal ring, for providing an audio grounding;
- a first insulation layer, formed inside the first metal ring;
- a second metal ring, formed inside the first insulation layer, for transmitting the audio signal;
- a second insulation layer, formed inside the second metal ring; and
- a radio-frequency transmission stick, formed inside the second insulation layer, for transmitting the broadcast signal;
  - wherein a shape of the transmission plug conforms to an international standard audio plug.

2. The transmission plug of claim 1, wherein the radio-frequency transmission stick comprises:
- a third metal ring, formed inside the second insulation layer, for providing a radio-frequency grounding;
- a third insulation layer, formed inside the third metal ring; and
- a metal stick, formed inside the third insulation layer, for transmitting the broadcast signal.

3. The transmission plug of claim 1, wherein the radio-frequency transmission stick is formed inside the second insulation layer and capable of moving back and forth.

4. The transmission plug of claim 3, wherein the radio-frequency transmission stick moves back and forth by means of rotation.

5. The transmission plug of claim 3, wherein the radio-frequency transmission stick moves back and forth by means of pressing.

6. The transmission plug of claim 1, wherein the broadcast signal is a satellite broadcast signal.

7. A complex earphone for a radio receiver comprising:
- a reception antenna, for receiving a broadcast signal;
- an audio output device, for playing an audio signal; and
- a transmission plug, capable of being coupled to the radio receiver by means of plugging, with a shape conforming to an international standard audio plug, the transmission plug comprising:
  - a first metal ring, coupled to the audio output device, for providing an audio grounding;
  - a first insulation layer, formed inside the first metal ring;
  - a second metal ring, formed inside the first insulation layer, and coupled to the audio output device, for transmitting the audio signal;
  - a second insulation layer, formed inside the second metal ring; and
  - a radio-frequency transmission stick, formed inside the second insulation layer, and coupled to the reception antenna, for transmitting the broadcast signal.

8. The complex earphone of claim 7, wherein the radio-frequency transmission stick comprises:
- a third metal ring, formed inside the second insulation layer for providing a radio-frequency grounding;
- a third insulation layer, formed inside the third metal ring; and
- a metal stick, formed inside the third insulation layer for transmitting the broadcast signal.

9. The complex earphone of claim 7, wherein the radio-frequency transmission stick is formed inside the second insulation layer and capable of moving back and forth.

10. The complex earphone of claim 9, wherein the radio-frequency transmission stick moves back and forth by means of rotation.

11. The complex earphone of claim 9, wherein the radio-frequency transmission stick moves back and forth by means of pressing.

12. The complex earphone of claim 7, wherein the broadcast signal is a satellite broadcast signal.

13. A radio player comprising:
- a radio receiver, for processing a broadcast signal and outputting a corresponding audio signal;
- a jack, formed in the radio receiver, comprising:
  - a first metal spring pin, for providing an audio grounding;
  - a second metal spring pin, for transmitting the audio signal; and
  - a radio-frequency reception jack, for transmitting the broadcast signal; and
- a complex earphone comprising:
  - a reception antenna, for receiving the broadcast signal;
  - an audio output device, for playing the audio signal; and
  - a transmission plug, capable of being coupled to the jack by means of plugging in, with a shape conforming to an international standard audio plug, the transmission plug comprising:
    - a first metal ring, coupled to the audio output device and the first metal spring pin, for providing the audio grounding;
    - a first insulation layer, formed inside the first metal ring;
    - a second metal ring, formed inside the first insulation layer, and coupled to the audio output device and the second metal spring pin, for transmitting the audio signal;
    - a second insulation layer, formed inside the second metal ring; and
    - a radio-frequency transmission stick, formed inside the second insulation layer, and coupled to the reception antenna and the radio-frequency reception jack, for transmitting the broadcast signal.

14. The radio player of claim 13, wherein the radio-frequency transmission stick comprises:

a third metal ring, formed inside the second insulation layer, for providing a radio-frequency grounding;

a third insulation layer, formed inside the third metal ring; and a metal stick, formed inside the third insulation layer, for transmitting the broadcast signal.

15. The radio player of claim 14, wherein the radio-frequency reception jack comprises:

a fourth metal ring, for coupling to the third metal ring to provide the radio-frequency grounding; and a hole, for coupling to the metal stick to transmit the broadcast signal to the radio receiver.

16. The radio player of claim 13, wherein the radio-frequency transmission stick is formed inside the second insulation layer and capable of moving back and forth.

17. The radio player of claim 16, wherein the radio-frequency transmission stick moves back and forth by means of rotation.

18. The radio player of claim 16, wherein the radio-frequency transmission stick moves back and forth by means of pressing.

19. The radio player of claim 13, wherein the international standard audio plug is a 2.5 mm or 3.5 mm international standard audio plug.

20. The radio player of claim 13, wherein the broadcast signal is a satellite broadcast signal.

* * * * *